US012628205B2

(12) United States Patent (10) Patent No.: US 12,628,205 B2
Jiang et al. (45) Date of Patent: May 12, 2026

(54) RANDOM ACCESS METHOD AND APPARATUS, TERMINAL, AND NETWORK SIDE DEVICE

(71) Applicant: VIVO MOBILE COMMUNICATION CO., LTD., Dongguan (CN)

(72) Inventors: Dajie Jiang, Dongguan (CN); Yuanyuan Wang, Dongguan (CN); Xueming Pan, Dongguan (CN); Pu Yuan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 418 days.

(21) Appl. No.: 18/205,498

(22) Filed: Jun. 2, 2023

(65) Prior Publication Data

US 2023/0319893 A1 Oct. 5, 2023

Related U.S. Application Data

(63) Continuation of application No. PCT/CN2021/134968, filed on Dec. 2, 2021.

(30) Foreign Application Priority Data

Dec. 4, 2020 (CN) .......................... 202011415213.2

(51) Int. Cl.
*H04W 74/0833* (2024.01)
*H04W 74/00* (2009.01)
(52) U.S. Cl.
CPC ..... *H04W 74/0833* (2013.01); *H04W 74/004* (2013.01)

(58) Field of Classification Search
None
See application file for complete search history.

(56) References Cited

U.S. PATENT DOCUMENTS

2017/0055273 A1* 2/2017 Sharma ................. H04W 4/021
2019/0342874 A1* 11/2019 Davydov .............. H04W 72/23
(Continued)

FOREIGN PATENT DOCUMENTS

CN 102630090 A 8/2012
CN 105264999 A 1/2016
(Continued)

OTHER PUBLICATIONS

Extended European Search Report issued in related European Application No. 21900049.4, mailed Mar. 26, 2024, 9 pages.
(Continued)

*Primary Examiner* — Faiyazkhan Ghafoerkhan
(74) *Attorney, Agent, or Firm* — IPX PLLC

(57) ABSTRACT
This application discloses a random access method and apparatus, a terminal, and a network side device, belonging to the field of communication technologies. The method includes: sending a random access first target message, where a transmission parameter of the first target message is associated with position related information of the terminal, or the first target message carries position related information of the terminal, where the transmission parameter of the first target message includes at least one of: sequence information of the first target message; time domain resource information of the first target message; frequency domain resource information of the first target message; and sequence information of a demodulation reference signal included in the first target message.

20 Claims, 6 Drawing Sheets

(56) References Cited

U.S. PATENT DOCUMENTS

| | | | | |
|---|---|---|---|---|
| 2020/0344813 A1* | 10/2020 | Li | ........................ | H04W 74/002 |
| 2021/0100040 A1* | 4/2021 | Bhardwaj | ................. | H04L 1/18 |
| 2021/0105788 A1* | 4/2021 | Kim | ..................... | H04W 76/10 |
| 2021/0185637 A1* | 6/2021 | Agarwal | ............... | H04W 72/23 |
| 2021/0307100 A1* | 9/2021 | Talebi Fard | ......... | H04W 76/18 |
| 2022/0124820 A1* | 4/2022 | Ko | ..................... | H04W 74/002 |
| 2022/0124821 A1* | 4/2022 | Taherzadeh Boroujeni | ............... H04L 5/0048 |
| 2022/0141877 A1* | 5/2022 | Ko | ..................... | H04W 74/0833 |
| | | | | 370/329 |
| 2022/0210845 A1* | 6/2022 | Ko | ..................... | H04W 72/1263 |
| 2022/0225434 A1* | 7/2022 | Kim | ..................... | H04W 76/30 |
| 2022/0225472 A1* | 7/2022 | Kim | ..................... | H04W 76/30 |
| 2022/0248493 A1* | 8/2022 | Kim | ..................... | H04W 76/25 |
| 2023/0040076 A1* | 2/2023 | Kim | ..................... | H04W 76/30 |
| 2023/0051568 A1* | 2/2023 | Kim | ................. | H04W 74/0833 |
| 2023/0081864 A1* | 3/2023 | Ko | ..................... | H04W 74/002 |
| | | | | 370/329 |
| 2023/0122928 A1* | 4/2023 | Talebi Fard | ......... | H04W 72/27 |
| | | | | 370/329 |
| 2023/0247720 A1* | 8/2023 | Kim | ..................... | H04W 76/30 |
| | | | | 370/328 |
| 2023/0319893 A1* | 10/2023 | Jiang | ................. | H04W 74/0833 |
| | | | | 370/328 |
| 2023/0319894 A1* | 10/2023 | Jiang | ..................... | H04L 5/0094 |
| 2023/0328811 A1* | 10/2023 | Kim | ..................... | H04W 76/11 |
| | | | | 370/328 |
| 2023/0345573 A1* | 10/2023 | Kim | ..................... | H04W 76/27 |
| 2024/0224370 A1* | 7/2024 | Kim | ..................... | H04W 76/25 |
| 2024/0365277 A1* | 10/2024 | Rao | ..................... | H04W 64/00 |
| 2025/0039982 A1* | 1/2025 | Kim | ..................... | H04W 76/30 |

FOREIGN PATENT DOCUMENTS

| | | |
|---|---|---|
| CN | 106470422 A | 3/2017 |
| EP | 4195786 A1 | 6/2023 |
| WO | 2019028924 A1 | 2/2019 |
| WO | 2019029341 A1 | 2/2019 |
| WO | 2020227857 A1 | 11/2020 |
| WO | 2022117021 A1 | 6/2022 |

OTHER PUBLICATIONS

First Office Action issued in related Chinese Application No. 202011415213.2, mailed Sep. 30, 2024, 8 pages.

International Search Report issued in corresponding International Application No. PCT/CN2021/134968, mailed Feb. 22, 2022, 4 pages.

* cited by examiner

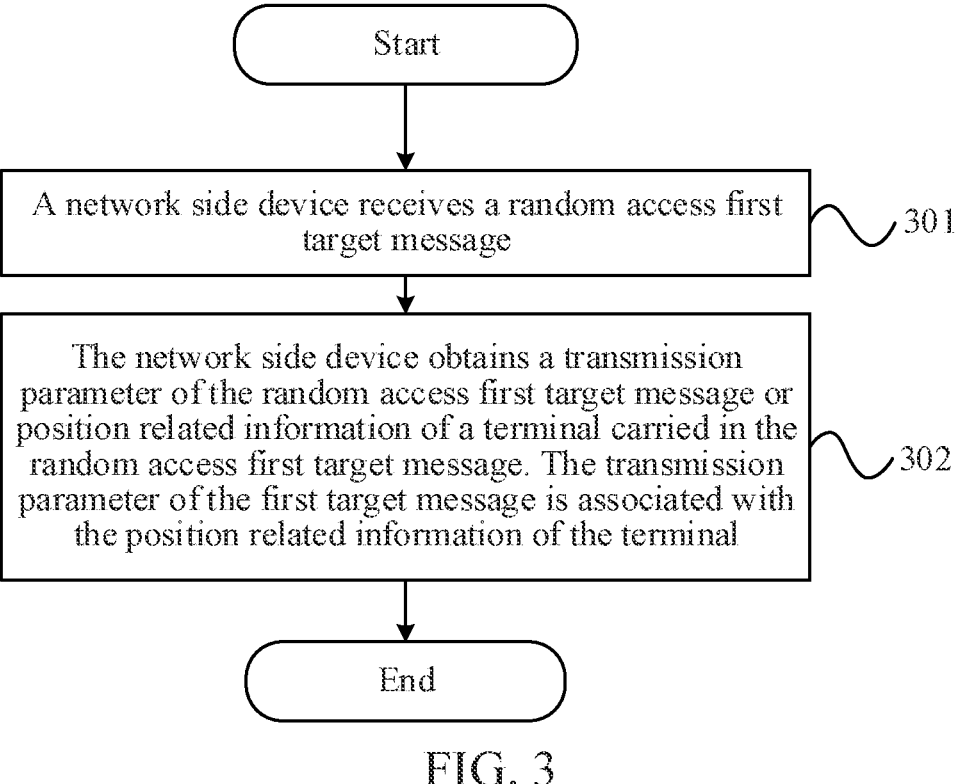

Start

A network side device receives a random access first target message

301

The network side device obtains a transmission parameter of the random access first target message or position related information of a terminal carried in the random access first target message. The transmission parameter of the first target message is associated with the position related information of the terminal

302

End

RANDOM ACCESS METHOD AND APPARATUS, TERMINAL, AND NETWORK SIDE DEVICE

CROSS-REFERENCE TO RELATED APPLICATIONS

This application is a continuation of International Application No. PCT/CN2021/134968, filed on Dec. 2, 2021, which claims priority to Chinese Patent Application No. 202011415213.2, filed on Dec. 4, 2020, The entire contents of each of the above-identified applications are expressly incorporated herein by reference.

TECHNICAL FIELD

This application belongs to the field of communication technologies, and in particular, to a random access method and apparatus, a terminal, and a network side device.

BACKGROUND

In a conventional cell-based system, each cell has a specific coverage area. When a terminal communicates with the cell, a downlink or uplink signal is associated with information (such as a cell ID) about or a configuration parameter of the cell. When the terminal moves between different cells, an inter-cell handover or a cell reselection needs to be performed. A terminal at an edge of a cell is usually interfered by a neighboring cell (inter-cell interference).

A concept of cell free abandons an idea of cell. In this case, a system is composed of many Access Points (AP) or Transmission Reception Points (TRP), and the terminal communicates with one or more neighboring APs or TRPs at the same time. When the terminal moves between the AP or the TRP, a serving AP or TRP of the terminal changes. In this case, the inter-cell handover or the cell reselection does not happen. Typically, a terminal is not subject to strong interference from a neighboring AP or TRP (because N APs or TRPs adjacent to the terminal usually serve as serving APs or TRPs of the terminal, and N is greater than or equal to 1).

In the conventional cell (cell)-based system, in a random access process, the terminal needs to determine a RACH occasion based on a measured synchronization signal block index whose reference signal received power of a serving cell is greater than a target value, and send a MSG 1. A network side device determines a corresponding synchronization signal block index based on related information about the received MSG 1, to send a MSG 2 based on the determined synchronization signal block index.

Because the concept of cell free abandons the idea of cell, the existing random access process is no longer suitable for a cell free system.

SUMMARY

Embodiments of this application provide a random access method and apparatus, a terminal, and a network side device.

According to a first aspect, an embodiment of this application provides a random access method. The method includes:

A terminal sends a random access first target message. A transmission parameter of the first target message is associated with position related information of the terminal, or the first target message carries position related information of the terminal.

The transmission parameter of the first target message includes at least one of:

sequence information of the first target message;

time domain resource information of the first target message;

frequency domain resource information of the first target message; and sequence information of a demodulation reference signal included in the first target message.

According to a second aspect, an embodiment of this application provides a random access apparatus. The apparatus is applied to a terminal and includes:

a first sending module, configured to send a random access first target message. A transmission parameter of the first target message is associated with position related information of the terminal, or the first target message carries position related information of the terminal.

The transmission parameter of the first target message includes at least one of:

sequence information of the first target message;

time domain resource information of the first target message;

frequency domain resource information of the first target message; and sequence information of a demodulation reference signal included in the first target message.

According to a third aspect, an embodiment of this application provides a random access method. The method includes:

A network side device receives a random access first target message.

The network side device obtains a transmission parameter of the random access first target message or position related information of a terminal carried in the random access first target message. The transmission parameter of the first target message is associated with the position related information of the terminal.

The transmission parameter of the first target message includes at least one of:

sequence information of the first target message;

time domain resource information of the first target message;

frequency domain resource information of the first target message; and sequence information of a demodulation reference signal included in the first target message.

According to a fourth aspect, an embodiment of this application provides a random access apparatus. The apparatus is applied to a network side device and includes:

a first receiving module, configured to receive a random access first target message; and a first obtaining module, configured to obtain a transmission parameter of the random access first target message or position related information of a terminal carried in the random access first target message. The transmission parameter of the first target message is associated with the position related information of the terminal.

The transmission parameter of the first target message includes at least one of:

sequence information of the first target message;

time domain resource information of the first target message;

frequency domain resource information of the first target message; and sequence information of a demodulation reference signal included in the first target message.

According to a fifth aspect, an embodiment of this application provides a terminal. The terminal includes a processor, a memory, and a program or an instruction stored in the memory, and executable by the processor. The program or instruction, when executed by the processor, implements steps of the method according to the first aspect.

According to a sixth aspect, an embodiment of this application provides a network side device. The network side device includes a processor, a memory, and a program or an instruction stored in the memory and executable by the processor. The program or instruction, when executed by the processor, implements steps of the method according to the third aspect.

According to a seventh aspect, an embodiment of this application provides a readable storage medium. The readable storage medium stores a program or an instruction. The program or instruction, when executed by a processor, implements steps of the method according to the first aspect, or steps of the method according to the third aspect.

According to an eighth aspect, an embodiment of this application provides a chip. The chip includes a processor and a communication interface, the communication interface is coupled to the processor, and the processor is configured to run a program or an instruction of a network side device to implement the method according to the first aspect, or the method according to the third aspect.

According to a ninth aspect, an embodiment of this application provides a program product. The program product is stored in a non-volatile storage medium, and the program product is executed by at least one processor to implement steps of the method according to the first aspect, or steps of the method according to the third aspect.

According to a tenth aspect, an embodiment of this application provides a communication device. The communication device is configured to perform steps of the method according to the first aspect, or steps of the method according to the third aspect.

In embodiments of this application, a terminal explicitly or implicitly indicates position related information of the terminal through a random access first target message, so that a network side device may adjust, based on the position related information of the terminal, related information of a node and/or a beam for sending a second target message.

BRIEF DESCRIPTION OF THE DRAWINGS

FIG. 3 is a second schematic diagram of steps of a random access method according to an embodiment of this application;

DETAILED DESCRIPTION

The following describes the embodiments of this application with reference to the accompanying drawings in embodiments of this application. Apparently, the described embodiments are some rather than all of embodiments of this application. All other embodiments obtained by a person of ordinary skill in the art based on embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data used in such a way is interchangeable in proper circumstances, so that embodiments of this application can be implemented in other sequences than the sequence illustrated or described herein. In addition, objects distinguished by "first," "second," and the like are usually of one type, and a quantity of the objects is not limited. For example, a first object may be one or more than one. In addition, "and/or" in the specification and claims represents at least one of connected objects. The character "/" generally indicates an "or" relationship between the associated objects.

It is worth noting that technologies described in embodiments of this application are not limited to a Long Term Evolution (LTE)/LTE-Advanced (LTE-A) system, but may further be used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in embodiments of this application are often used interchangeably, and the described technologies may be used for not only the foregoing systems and radio technologies, but also other systems and radio technologies. The following description describes a New Radio (NR) system for a purpose of example, and an NR term is used in many parts of the following description. However, these technologies are also applicable to an application other than an NR system application, such as a $6^{th}$ Generation (6G) communication system.

Figure 1:
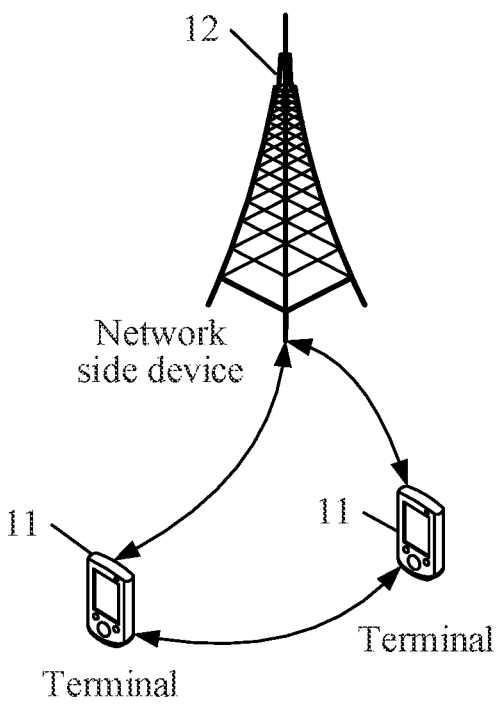
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or User Equipment (UE). The terminal 11 may be a terminal-side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MTD), a wearable device or Vehicle User Equipment (VUE), Pedestrian User Equipment (PUE), and the like. The wearable device includes: a bracelet, a headphone, glasses, and the like. It needs to be noted that, embodiments of this application do not limit a specific type of the terminal 11. The network side device 12 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a Wireless Local Area Network (WLAN) access point, a WiFi node, a Transmission Reception Point (TRP), or some another suitable term in the described art. As long as the same technical effect is achieved, the base station is not limited to a specific technical term. It needs to be noted that, in embodiments of this application, only a base station in the NR system is used as an example, but a specific type of the base station is not limited.

The following describes the random access method and apparatus, the terminal, and the network side device provided in embodiments of this application in detail through specific embodiments and application scenarios thereof with reference to the accompanying drawings.

Figure 2:
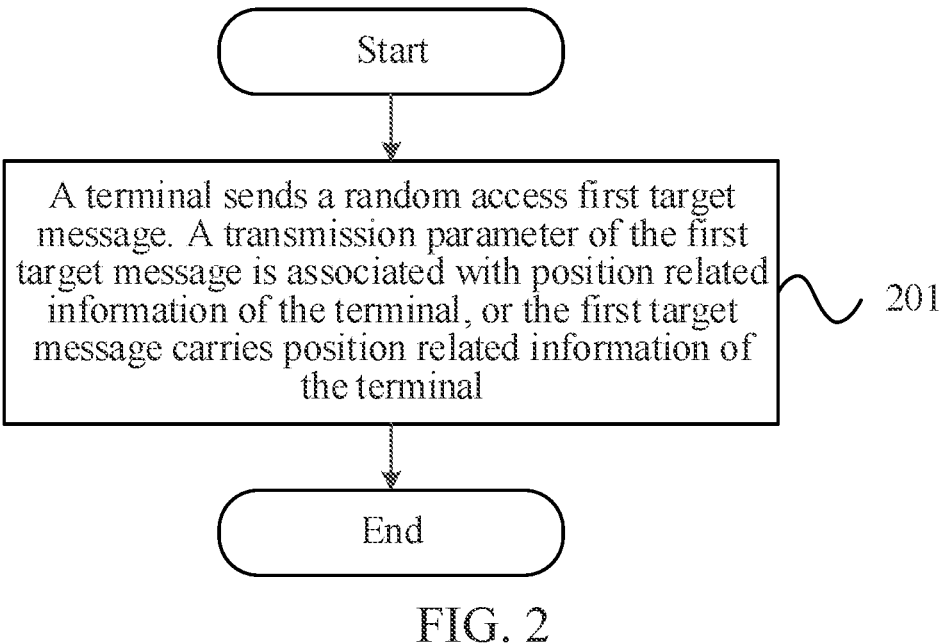
FIG. 2 is a first schematic diagram of steps of a random access method according to an embodiment of this application.

Referring to FIG. 2, at least one embodiment of this application provides a random access method. The method includes:

Step 201: A terminal sends a random access first target message. A transmission parameter of the first target message is associated with position related information of the terminal, or the first target message carries position related information of the terminal.

The transmission parameter of the first target message includes at least one of:

sequence information of the first target message;
time domain resource information of the first target message;
frequency domain resource information of the first target message; and
sequence information of a DeModulation Reference Signal (DMRS) included in the first target message.

It needs to be noted that, the first target message may be a message 1 (also referred to as a MSG 1) or a message 3 (that is, a MSG 3).

For example, when the first target message is the MSG 1, a transmission parameter of the MSG 1 includes: at least one of sequence information of the MSG 1, time domain resource information of the MSG 1, and frequency domain resource information of the MSG 1. That the transmission parameter of the MSG 1 is associated with the position related information of the terminal means that the terminal implicitly indicates the position related information of the terminal through the transmission parameter of the MSG 1.

The sequence information of MSG 1 includes: a preamble index or a preamble ID. The preamble index or the preamble ID is associated with a preamble sequence format (such as at least one of a sequence length, subcarrier spacing, and a root sequence). A correspondence between the preamble index or the preamble ID and the sequence information is predefined or configured by a base station, or some related parameters of the correspondence between the preamble index or the preamble ID and the sequence information are configured by the base station, and a related rule or a calculation formula of the correspondence is predefined.

In another example, when the first target message is the MSG 3, the transmission parameter of the MSG 3 includes: sequence information of a DMRS of the MSG 3. The sequence information of the DMRS includes: at least one of a sequence identifier, a scrambling sequence, an initialization sequence, a cyclic shift of a sequence, and an orthogonal cover code. That the transmission parameter of the MSG 3 is associated with the position related information of the terminal means that the terminal implicitly indicates the position related information of the terminal through the transmission parameter of the MSG 3.

In at least one embodiment of this application, after the terminal sends the random access first target message, the method further includes:

receiving, by the terminal, a random access second target message sent by at least one first node, where sending related information of the second target message is associated with the transmission parameter of the first target message, or sending related information of the second target message is associated with the position related information of the terminal, where the sending related information of the second target message includes at least one of: identification information of the at least one first node; and beam related information of the second target message. The first node is an Access Point (AP) or a TRP, and this is not specifically limited herein.

It needs to be noted that, the beam related information mentioned in the embodiment of this application includes: at least one of a direction of a beam, Quasi Co-Location (QCL) information, and Transmission Configuration Index (TCI) state information. This is not repeated in the following.

In the embodiment of this application, the network side device determines, based on the position information of the terminal implicitly or explicitly indicated by the first target message, related information of a node or a beam for sending the second target message, to reduce potential inter-node interference and improve received signal quality of the second target message.

In an embodiment, the first target message includes: a MSG 1 in a four-step random access, and the second target message includes: at least one of a MSG 2 and a MSG 4 in the four-step random access.

In another embodiment, the first target message includes: a MSG 3 in a four-step random access; and the second target message includes: a MSG 4 in the four-step random access.

Because at least one embodiment of this application needs to explicitly or implicitly indicate the position related information of the terminal through the first target message, in at least one embodiment of this application, before step 201, the method includes:

measuring N1 first signals, and determining the position related information of the terminal, where N1 is an integer greater than or equal to 1.

It needs to be noted that, the first signal mentioned in the embodiment of this application includes at least one of: a Synchronization Signal and PBCH Block (SSB); a Channel State Information Reference Signal (CSI-RS); a Tracking Reference Signal (TRS); a Positioning Reference Signal (PRS); and another downlink reference signal. This is not repeated in the following.

In an embodiment, the N1 first signals are signals from a same cell or signals from different cells (for example, a serving cell and a neighboring cell). In an embodiment, in a cell free scenario, the N1 first signals are sent through a same node or different nodes (for example. N1 SSBs are associated with different nodes).

In an embodiment, sync rasters of the N1 first signals are different.

In an embodiment, frequency domain resources (for example, a carrier or a Resource Block (RB)) and/or time domain resources of the N1 first signals are different.

In an embodiment, sequence formats of the N1 first signals are different,

In an embodiment, Reference Signal Received Power (RSRP)/Signal to Interference plus Noise Ratio (SINR)/Reference Signal Received Quality (RSRQ) of the N1 first signals is all greater than or equal to a first threshold, and/or a difference between the RSRP/SINR/RSRQ of the N1 first signals is less than or equal to a second threshold. The first threshold and the second threshold are notified to the terminal by the network side device through a system message.

In an embodiment, the position related information of the terminal is obtained through one or more of Global Navigation Satellite System (GNSS), Radio Frequency IDentification (RFID), Ultra Wide Band (UWB), Bluetooth, Wi-Fi, network-based positioning technology (that is, the terminal determines, based on detected information about the N1(N>=(1) first signals, its own position related information) or another related positioning technology.

In another embodiment, the position related information of the terminal includes:

position information of the terminal; and a measurement item related to a terminal position and measured by the terminal. The measurement item may also be referred to as incomplete information, and the network side device may obtain, based on the incomplete information and other information (such as a position of the base station), the position information of the terminal.

For example, the position information of the terminal includes at least one of:

a two-dimensional grid in two-dimensional coordinates based on an origin, or a three-dimensional grid in three-dimensional coordinates based on an origin;

a subregion in polar coordinates based on an origin, where a format of the position information (for example, at least one of a size of a grid, a size of a subregion in the polar coordinates, selection of the origin, and the like) is sent to the terminal by the base station, or agreed by a protocol;

absolute latitude and longitude information;

relative position information, that is, relative position information relative to a reference point or previously reported position information;

position change indication information;

position region change indication information; and position quality information.

In another example, the measurement item related to the terminal position and measured by the terminal includes at least one of:

angles of arrival (and beam related information) of different first signals;

RSRP of different first signals; and a time delay between different first signals.

In at least one embodiment of this application, the method further includes:

determining, based on the position related information of the terminal, the transmission parameter of the first target message associated with the position related information. For example, the transmission parameter of the MSG 1 is determined based on the position related information of the terminal. In another example, the scrambling sequence of the DMRS of the MSG 3 is determined based on the position related information of the terminal.

Correspondingly, step 201 includes:

sending the first target message based on the determined transmission parameter.

For example, the terminal determines, based on the position related information and a first mapping relationship, the transmission parameter of the MSG 1. The first mapping relationship defines a correspondence between the position related information and the transmission parameter of the MSG 1, for example, a mapping relationship between different position regions and sequence formats, time domain resources, and frequency domain resources of different MSGs 1. The first mapping relationship is defined by a protocol or configured by a base station, or some parameters of the first mapping relationship are configured by a base station and a related rule or a calculation formula of the first mapping relationship is defined by a protocol.

Table 1 is a table of association between the transmission parameter of the MSG 1 and the position related information of the terminal.

TABLE 1

| Position information of terminal | MSG 1 related information |
|---|---|
| Position 1 | {preamble index, preamble time domain resource, preamble frequency domain resource} combination 1 |
| Position 2 | {preamble index, preamble time domain resource, preamble frequency domain resource} combination 2 |
| Position 3 | {preamble index, preamble time domain resource, preamble frequency domain resource} combination 3 |
| Position 4 | {preamble index, preamble time domain resource, preamble frequency domain resource} combination 4 |

Each combination of {preamble index, preamble time domain resource, preamble frequency domain resource} may include a plurality of value combinations of preamble indexes, preamble time domain resources, and preamble frequency domain resources, and the terminal may select a value combination of {preamble index, preamble time domain resource, preamble frequency domain resource} to send.

For example, there are two specific methods:

Method 1: The terminal determines, based on the position information or other measurement information, a RACH Occasion (RO) associated with the position information, and then selects a preamble from all preambles of the RO, for example, randomly selects a preamble. The RO is defined as a time domain resource and a frequency domain resource of one MSG 1 transmission.

Method 2: The terminal determines, based on the position information or other measurement information, an RO associated with the position information and a preamble candidate set, and then selects a preamble from the preamble candidate set, for example, randomly selects a preamble.

In another embodiment, in a case that the first target message is the MSG 1, before step 201, the method further includes:

determining, based on at least one of measured reference signal received power RSRP of N2 first signals and N2 path losses, at least one of transmit power and a sending carrier of the first target message, where N2 is an integer greater than or equal to 1, and the N2 path losses are associated with the RSRP of the N2 first signals. Because the first signal is sent by a plurality of nodes, path losses of the plurality of nodes to the terminal are considered in transmit power of the MSG 1.

For example, real values of the N2 path losses are added to obtain a sum, then a target reference path loss is obtained by taking a logarithm of the sum with a base of 10, and the transmit power is calculated based on the target reference path loss.

Correspondingly, step 201 includes:

sending the first target message based on at least one of the determined transmit power and the determined sending carrier of the first target message.

If a plurality of uplink carriers (for example, a high frequency carrier and a low frequency carrier) are configured in the terminal as optional carriers for sending the MSG 1, if the RSRP/SINR/RSRQ of the N2 first signals are all less than a third threshold or a sum of the RSRP/SINR/RSRQ of the N2 first signals is less than a third threshold, the terminal sends the MSG 1 through a target carrier (for example, a carrier whose frequency is lower). Otherwise, the MSG 1 is sent through another carrier (for example, a carrier whose frequency is higher).

It needs to be noted that, when the transmit power of the MSG 1 is considered, if the MSG 1 is retransmitted, transmit power of the retransmitted MSG 1 is raised based on a number of retransmissions. If an SSB index is changed when the MSG 1 is retransmitted, no power raise is performed.

In an embodiment, a method for determining a beam for sending the MSG 1 by the terminal is as follows: If it is FR2, the MSG 1 needs to be sent to two nodes through two beams of one panel or two beams of two panels.

In at least one embodiment of this application, in a case that the first target message is the message 1 and the second target message is the message 2, the message 2 includes at least one of:

identification information of a sending node of the message 4;

sending beam related information of the message 4;

time domain resource information of the message 4; and frequency domain resource information of the message 4.

The terminal receives the message 4 by using relevant information of the message 4 carried in the message 2. The message 2 is also used for indicating a time-frequency domain resource and a transmission format of the message 3.

In an embodiment, the receiving a random access second target message sent by at least one first node includes:

receiving, based on target beam related information, the random access second target message sent by the at least one first node, where when the second target message is the message 2, the target beam related information is beam related information of at least one first signal with greatest signal strength in N3 first signals measured by the terminal; or when the second target message is the message 4, the target beam related information is beam related information of the message 2.

In an embodiment, before the receiving a random access second target message sent by at least one first node, the method further includes:

receiving a first signal sent by the at least one first node. The first signal is used for assisting the terminal to receive the second target message.

The receiving a random access second target message sent by at least one first node includes:

receiving, based on beam related information of the first signal sent by the at least one first node, the random access second target message sent by the at least one first node. A DMRS of the second target message is quasi co-located with the first signal.

In other words, if the terminal detects the first signal sent by the at least one first node before receiving the MSG 2 or the MSG 4, the terminal assumes that a DMRS of the MSG 2 or the MSG 4 is quasi co-located with the first signal. In an embodiment, if the terminal does not detect the first signal sent by the at least one first node before receiving the MSG 2, the terminal assumes that a DMRS of the MSG 2 is quasi co-located with a first signal whose signal strength is detected to be highest before. In an embodiment, if the terminal does not detect the first signal sent by the at least one first node before receiving the MSG 4, the terminal assumes that a DMRS of the 4 is quasi co-located with the DMRS of the MSG 2.

If the terminal directly carries the position related information of the terminal in the first target message, in an embodiment, the second target message further includes: the position related information of the terminal.

In an embodiment, after the receiving a random access second target message sent by at least one first node, the method further includes:

determining, if the position related information of the terminal carried in the second target message is the same as the position related information of the terminal carried in the first target message, that the terminal successfully receives the second target message;

or, resending the first target message if the position related information of the terminal is not carried in the second target message, or the position related information of the terminal carried in the second target message is different from the position related information of the terminal carried in the first target message. For example, when the terminal retransmits the MSG 1, a transmission format of the retransmitted MSG 1 is the same as an initial transmission format. Transmit power of the retransmitted MSG 1 is higher than transmit power of an initial transmission.

It needs to be noted that, if the second target message is the MSG 2, the MSG 2 also carries a preamble index. In addition to judgment on the position related information, whether the preamble index in the MSG 2 is the same as the preamble index in the MSG 1 need to be judged to determine whether the terminal successfully receives the MSG 2. For example, if the preamble index in the MSG 2 is the same as the preamble index in the MSG 1, and the position related information of the terminal carried in the MSG 2 is the same as the position related information of the terminal carried in the MSG 1, the terminal determines that the MSG 2 is successfully received, and in this case, the terminal stops listening to the MSG 2.

Following the above example, in a case that the first target message is the MSG 1 and. the second target message is the MSG 2, after the terminal successfully receives the MSG 2, the method further includes:

sending the message 3 to a target node in the at least one first node, where the message 3 implicitly or explicitly indicates that the terminal successfully receives sending related information corresponding to the message 2; and receiving the message 4 sent by the target node, where beam related information of the message 4 is the same as beam related information of the message 2; or beam related information of the message 4 is the same as beam related information carried in the message 3.

If the terminal successfully receives a MSG 2, and a preamble index and position related information carried in the MSG 2 are the same as a preamble index and position related information sent by the terminal, the terminal sends the MSG 3. The MSG 3 implicitly (for example, through a scrambling sequence of the DMRS) or explicitly (for example, through a bit of the MSG 3 indicates node information and/or beam related information corresponding to the MSG 2 successfully received by the terminal. The terminal may expect to receive N4 MSGs 2, and select, based on signal strength or another criterion, one of the MSGs 2 to reply (that is, send the MSG 3); and decide, based on the selected MSG 2, to receive the beam related information of the MSG 4 (that is, the selected MSG 2 is quasi co-located with the MSG 4.

In another embodiment, in a case that the first target message is the message 3 and the second target message is the message 4, the method further includes:

sending, before the message 3 is sent, a reference signal associated with a terminal identifier;

sending, after the message 3 is sent, a reference signal associated with a terminal identifier; or sending a reference signal associated with a terminal identifier on at least one symbol of a slot in which the message 3 is located.

For example, the reference signal is a Sounding Reference Signal (SRS). An association rule between the reference signal and the terminal identifier is predefined. The network side device may calculate a position of the terminal based on SRSs received by a plurality of nodes. The network side device further determines sending related information of a MSG 4 corresponding to the position of the terminal, and sends the MSG 4 by using the determined sending related information.

It needs to be noted that, if the SRS is sent before or after the message 3, a time-frequency domain resource of the SRS is notified to the terminal by the base station through the MSG 2. If the SRS is sent on at least one symbol of a slot in which the message 3 is located, the time-frequency domain resource of the SRS is the same as the time-frequency domain resource of the message 3.

In an embodiment, before step 201, the method further includes:

receiving first signaling, where the first signaling includes at least one of the following information:

identification information of at least two cells;

identification information of at least two nodes;

position information of the at least two cells;

position information of the at least two nodes;

information about a first signal associated with each cell; and information about a first signal associated with each node.

In other words, before sending the MSG 1, the terminal receives at least one of a plurality of pieces of cell or node information (for example, ID information) indicated by the base station through the first signaling (for example, System Information Block (SIB) signaling), position information (which may be encrypted) of the cell or node, and information about first signals respectively associated by the cell or node (for example, sequence information of the signals, time-frequency resources of the signals, and the like). The SIB signaling is a SIB sent by a cell or a node, or a SIB sent through an Single Frequency Network (SFN).

In another embodiment, before step 201, the method further includes:

receiving second signaling, where the second signaling is used for indicating resource information of a shared random access channel corresponding to at least two cells or at least two nodes. The resource information includes: at least one of time domain resource information, frequency domain resource information, and sequence resource information.

In other words, before sending the MSG 1, the terminal receives a Random Access CHannel (RACH) resource indicated by the base station through the second signaling (for example, a SIB). For example, in a cell free scenario, the second signaling includes information about shared RACH resources corresponding to a plurality of peripheral nodes. The SIB is a SIB sent by a cell or a node, or a SIB sent through an SFN.

For example, the base station may broadcast, through the SIB, information about a plurality of frequency points of the RACH resource, and the terminal may select one frequency point from the plurality of frequency points for performing RACH transmission, for example, select, based on a size of a measured SSB RSRP, one frequency point for performing RACH transmission.

In summary, in embodiments of this application, the terminal explicitly or implicitly indicates the position related information of the terminal through the random access first target message, so that the network side device may adjust, based on the position related information of the terminal, related information of a node and/or a beam for sending the second target message, to reduce potential inter-node interference and improve received signal quality of the second target message.

Referring to FIG. 3, at least one embodiment of this application further provides a random access method. The method includes:

Step 301. A network side device receives a random access first target message.

Step 302. The network side device obtains a transmission parameter of the random access first target message or position related information of a terminal carried in the random access first target message. The transmission parameter of the first target message is associated with the position related information of the terminal.

The transmission parameter of the first target message includes at least one of:

sequence information of the first target message;

time domain resource information of the first target message;

frequency domain resource information of the first target message; and sequence information of a demodulation reference signal included in the first, target message.

It needs to be noted that, the network side device may be an AP, or a TRP, or a central control unit. The central control unit may be arranged on an AP or a TRP, or at another position on a network side. This is not specifically limited herein.

It needs to be noted that, the first target message may be a message 1 (also referred to as a MSG 1) or a message 3 (that is, a MSG 3).

For example, when the first target message is the MSG 1, a transmission parameter of the MSG 1 includes: at least one of sequence information of the MSG 1, time domain resource information of the MSG 1, and frequency domain resource information of the MSG 1. That the transmission parameter of the MSG 1 is associated with the position related information of the terminal means that the terminal implicitly indicates the position related information of the terminal through the transmission parameter of the MSG 1.

The sequence information of MSG 1 includes: a preamble index or a preamble ID. The preamble index or the preamble ID is associated with a preamble sequence format (such as at least one of a sequence length, subcarrier spacing, and a root sequence). A correspondence between the preamble index or the preamble ID and the sequence information is predefined or configured by a base station, or some related parameters of the correspondence between the preamble index or the preamble ID and the sequence information are configured by the base station, and a related rule or a calculation formula of the correspondence is predefined.

In another example, when the first target message is the MSG 3, the transmission parameter of the MSG 3 includes: sequence information of a DMRS of the MSG 3. The sequence information of the DMRS includes: at least one of a sequence identifier, a scrambling sequence, an initialization sequence, a cyclic shift of a sequence; and an orthogonal cover code. That the transmission parameter of the MSG 3 is associated with the position related information of the terminal means that the terminal implicitly indicates the position related information of the terminal through the transmission parameter of the MSG 3.

In at least one embodiment of this application, the method further includes:

determining, by the network side device based on the transmission parameter of the first target message or the position related information of the terminal, sending related information of a random access second target message, where the sending related information of the second target message includes at least one of: identification information of at least one first node for sending the second target message, and beam related information of the second target message; and In an embodiment, the first target message includes: a MSG 3 in a four-step random access; and the second target message includes: a MSG 4 in the four-step random access.

In an embodiment, the determining, based on the transmission parameter of the first target message, sending related information of a random access second target message includes:

determining, based on the transmission parameter of the first target message, sending related information associated with the transmission parameter of the first target message; and determining the sending related information associated with the transmission parameter of the first target message as the sending related information of the second target message.

For example, when the second target message is the MSG 2, a table of association between the transmission parameter of the MSG 1 and beam related information of the MSG 2 is shown in Table 2.

TABLE 2

| Transmission parameter of MSG 1 | Beam related information of MSG 2 |
|---|---|
| {preamble index, preamble time domain resource, preamble frequency domain resource} combination 1 | Beam 1 of cell 1 (for example, with SSB1 QCL) |
| {preamble index, preamble time domain resource, preamble frequency domain resource} combination 2 | Beam 2 of cell 1 (with SSB2 QCL) |
| {preamble index, preamble time domain resource, preamble frequency domain resource} combination 3 | Beam 3 of cell 1 (with SSB3 QCL) |
| {preamble index, preamble time domain resource, preamble frequency domain resource} combination 4 | Beam 4 of cell 1 (with SSB4 QCL) | sending, by the network side device based on the sending related information of the second target message, the second target message through at least one first node. The first node is an access point AP or a transmission reception point TRP, and this is not specifically limited herein.

It needs to be noted that, the beam related information mentioned in the embodiment of this application includes: at least one of a direction of a beam, QCL information, and TCI state information. This is not repeated in the following.

In the embodiment of this application, the network side device determines, based on the position information of the terminal implicitly or explicitly indicated by the first target message, related information of a node or a beam for sending the second target message, to reduce potential inter-node interference and improve received signal quality of the second target message.

In an embodiment, the first target message includes: a MSG 1 in a four-step random access, and the second target message includes: at least one of a MSG 2 and a MSG 4 in the four-step random access.

In another example, when the second target message is the MSG 2, a table of association between the transmission parameter of the MSG 1 and sending related information of the MSG 2 is shown in Table 3.

TABLE 3

| Transmission parameter of MSG 1 | AP/TRP information of sending MSG 2 |
|---|---|
| {preamble index, preamble time domain resource, preamble frequency domain resource} combination 1 | AP/TRP 1 |
| {preamble index, preamble time domain resource, preamble frequency domain resource} combination 2 | AP/TRP 1, AP/TRP 2 |
| {preamble index, preamble time domain resource, preamble frequency domain resource} combination 3 | AP/TRP 2 |
| {preamble index, preamble time domain resource, preamble frequency domain resource} combination 4 | AP/TRP 3 |

In another example, when the second target message is the MSG 2, a table of association between the transmission parameter of the MSG 1 and sending related information of the MSG 2 is shown in Table 4.

TABLE 4

| Transmission parameter of MSG 1 | AP/beam related information of MSG 2 |
|---|---|
| {preamble index, preamble time domain resource, preamble frequency domain resource} combination 1 | Beam A of AP1 |

TABLE 4-continued

| Transmission parameter of MSG 1 | AP/beam related information of MSG 2 |
|---|---|
| {preamble index, preamble time domain resource, preamble frequency domain resource} combination 2 | Beam B of AP1 and AP2 (beam B is sent jointly through AP1 and AP2 |
| {preamble index, preamble time domain resource, preamble frequency domain resource} combination 3 | Beam C of AP2 |
| {preamble index, preamble time domain resource, preamble frequency domain resource} combination 4 | Beam D of AP3 and beam E of AP4 (beam D and beam E are respectively sent through AP3 and AP4 |

In another embodiment, the position related information of the terminal includes:

position information of the terminal; and a measurement item related to a terminal position and measured by the terminal. The measurement item may also be referred to as incomplete information, and the network side device may obtain, based on the incomplete information and other information (such as a position of the base station), the position information of the terminal.

For example, the position information of the terminal includes at least one of:

a two-dimensional grid in two-dimensional coordinates based on an origin, or a three-dimensional grid in three-dimensional coordinates based on an origin;

a subregion in polar coordinates based on an origin, where a format of the position information (for example, at least one of a size of a grid, a size of a subregion in the polar coordinates, selection of the origin, and the like) is sent to the terminal by the base station, or agreed by a protocol;

absolute latitude and longitude information;

relative position information, that is, relative position information relative to a reference point or previously reported position information;

position change indication information;

position region change indication information; and position quality information.

In another example, the measurement item related to the terminal position and measured by the terminal includes at least one of:

angles of arrival (and beam related information) of different first signals;

RSRP of different first signals; and a time delay between different first signals.

Correspondingly, the determining, based on the position related information of the terminal, sending related information of a random access second target message includes:

determining, based on the position related information of the terminal, sending related information associated with the terminal position; and determining the sending related information associated with the terminal position as the sending related information of the second target message.

For example, a table of association between the terminal position and the sending related information of the second target message (MSG 2 or MSG 4 is shown in Table 5.

TABLE 5

| Position information of terminal | Related information of beam for sending second target message |
|---|---|
| Position 1 | Beam 1 of cell 1 (for example, with SSB1 QCL) |
| Position 2 | Beam 2 of cell 1 (with SSB2 QCL) |
| Position 3 | Beam 3 of cell 1 (with SSB3 QCL) |
| Position 4 | Beam 4 of cell 1 (with SSB4 QCL) |

In an example, a table of association between the terminal position and the sending related information of the second target message (MSG 2 or MSG 4) is shown in Table 6.

TABLE 6

| Position information of terminal | Information about AP/TRP for sending second target message |
|---|---|
| Position 1 | AP/TRP 1 |
| Position 2 | AP/TRP 1, AP/TRP 2 |
| Position 3 | AP/TRP 2 |
| Position 4 | AP/TRP 3 |

In an example, a table of association between the terminal position and the sending related information of the second target message (MSG 2 or MSG 4) is shown in Table 7.

TABLE 7

| Position information of terminal | Information about AP/beam for sending second target message |
|---|---|
| Position 1 | Beam A of AP1 |
| Position 2 | Beam B of AP1 and AP2 (beam B is sent jointly through AP1 and AP2) |
| Position 3 | Beam C of AP2 |
| Position 4 | Beam D of AP3 and beam E of AP4 (beam D and beam E are respectively sent through AP3 and AP4) |

In at least one embodiment of this application, in a case that the first target message is the message 1 and the second target message is the message 2, the message 2 includes at least one of:

identification information of a sending node of the message 4;

sending beam related information of the message 4;

time domain resource information of the message 4; and frequency domain resource information of the message 4.

The terminal receives the message 4 by using relevant information of the message 4 carried in the message 2. The message 2 is also used for indicating a time-frequency domain resource and a transmission format of the message 3.

In an embodiment, before the sending, based on the sending related information of the second target message, the second target message through at least one first node, the method further includes:

sending a first signal through at least one first node, where the first signal is used for assisting the terminal to receive the second target message. Beam related information of the first signal is the same as the beam related information of the second target message. For example, a DMRS of the second target message is quasi co-located with the first signal.

If the terminal directly carries the position related information of the terminal in the first target message, in an embodiment, the second target message further includes: the position related information of the terminal.

In an embodiment, in a case that the first target message is the message 3 and the second target message is the message 4, before the sending, based on the sending related information of the second target message, the second target message through at least one first node, the method further includes:

receiving, by the network side device through at least, two nodes, a reference signal sent by the terminal and associated with a terminal identifier, and determining a terminal position; and sending the second target message based on sending related information associated with the terminal position.

For example, before sending the message 3, the terminal sends a reference signal associated with a terminal identifier. In an embodiment, after sending the message 3, the terminal sends a reference signal associated with a terminal identifier. In an embodiment, the terminal sends a reference signal associated with the terminal identifier on at least one symbol of a slot in which the message 3 is located. For example, the reference signal is a SRS. An association rule between the reference signal and the terminal identifier is predefined. The network side device may calculate a position of the terminal based on SRSs received by a plurality of nodes. The network side device further determines sending related information of a MSG 4 corresponding to the position of the terminal, and sends the MSG 4 by using the determined sending related information.

It needs to be noted that, if the SRS is sent before or after the message 3, a time-frequency domain resource of the SRS is notified to the terminal by the base station through the MSG 2. If the SRS is sent on at least one symbol of a slot in which the message 3 is located, the time-frequency domain resource of the SRS is the same as the time-frequency domain resource of the message 3.

In an embodiment, in step 301, the method further includes:

sending first signaling to the terminal, where the first signaling includes at least one of the following information:

identification information of at least two cells;
identification information of at least two nodes:
position information of the at least two cells;
position information of the at least two nodes;
information about a first signal associated with each cell; and
information about a first signal associated with each node.

In other words, before sending the MSG 1, the terminal receives at least one of a plurality of pieces of cell or node information (for example, ID information) indicated by the base station through the first signaling (for example, SIB signaling), position information (which may be encrypted) of the cell or node, and information about first signals respectively associated by the cell or node (for example, sequence information of the signals, time-frequency resources of the signals, and the like). The SIB signaling is a SIB sent by a cell or a node, or a SIB sent through an SFN.

In another embodiment, before step 301, the method further includes:

sending second signaling to the terminal, where the second signaling is used for indicating resource information of a shared random access channel corresponding to at least two cells or at least two nodes. The resource information includes: at least one of time domain resource information, frequency domain resource information, and sequence resource information.

In other words, before sending the MSG 1, the terminal receives a Random Access CHannel (RACH) resource indicated by the base station through the second signaling (for example, a SIB). For example, in a cell free scenario, the second signaling includes information about shared RACH resources corresponding to a plurality of peripheral nodes. The SIB is a SIB sent by a cell or a node, or a SIB sent through an SFN.

For example, the base station may broadcast, through the SIB, information about a plurality of frequency points of the RACH resource, and the terminal may select one frequency point from the plurality of frequency points for performing RACH transmission, for example, select, based on a size of a measured SSB RSRP, one frequency point for performing RACH transmission.

In summary, in embodiments of this application, the terminal explicitly or implicitly indicates the position related information of the terminal through the random access first target message, so that the network side may adjust, based on the position related information of the terminal, related information of a node and/or a beam for sending the second target message, to reduce potential inter-node interference and improve received signal quality of the second target message.

To describe the random access method provided in embodiments of this application, the following describes the random access method with reference to two examples.

Example 1: If a terminal explicitly or implicitly indicates, through a MSG 1, position related information of the terminal, a network side device determines, based on the position related information, sending related information of a MSG 2 and a MSG 4.

(1) The terminal determines its position related information.

(2) The terminal determines, based on the position related information, a transmission parameter of the MSG 1. The position related information has a first mapping relationship with the MSG 1, as shown in Table 1.

(3) The terminal sends the MSG 1 based on the determined transmission parameter of the MSG 1.

(4) A base station receives the MSG 1 sent by the terminal.

(5) The base station determines the sending related information of the MSG 2 based on the transmission parameter of the MSG 1, position related information carried by the MSG 1, or any one of Tables 2 to 7. Tables 2 to 7 may be obtained by training based on artificial intelligence or big data.

(6) The base station sends the MSG 2. to the terminal through the sending related information determined in (5).

In an embodiment, before (6), the base station sends an SSB or a TRS (for assisting the terminal to receive the MSG 2 to the terminal through the sending related information determined in (5). The SSB or the TRS is quasi co-located with a DMRS of the MSG 2 in (6).

(7) The terminal receives the MSG 2 sent by the base station. If the terminal detects the SSB or the TRS sent by the base station before the terminal receives the MSG 2, the terminal assumes that the DMRS of the MSG 2 is quasi co-located with the detected SSB or TRS. In an embodiment, the terminal assumes that the DMRS of the MSG 2 is quasi co-located with a strongest SSB or downlink reference signal detected when the position related information is determined in 1).

(8) When the terminal successfully receives a MSG 2, a preamble index in the MSG 2 is the same as a preamble index sent by the terminal, and position related information carried in the MSG 2 is the same as the position related information determined by the terminal in step 1, the terminal is considered to successfully receive the MSG 2, and in this case, the terminal may stop listening to the MSG 2. If the terminal does not receive the MSG 2, or if the terminal receives the MSG 2 but the MSG 2 does not carry the preamble index or the position related information of the terminal, the terminal retransmits the MSG 1.

(9) If the terminal successfully receives a MSG 2, and a preamble index and position related information carried in the MSG 2 are the same as the preamble index sent by the terminal and the position related information determined by the terminal, the terminal sends a MSG 3.

The terminal may expect to receive a plurality of MSGs 2, and select, based on signal strength or another criterion, one of the MSGs 2 to reply (that is, send the MSG 3), and decide, based on the selected MSG 2, to receive quasi co-location information of the MSG 4 (that is, the selected MSG 2 is quasi co-located with the MSG 4.

(10) If the base station successfully receives the MSG 3, the base station sends the MSG 4. A DMRS of the MSG 4 is quasi co-located with the DMRS of the MSG 2, or quasi co-located information of the DMRS of the MSG 4 is consistent with quasi co-location information carried. by the MSG 3.

Example 2: If a terminal explicitly or implicitly indicates position related information of the terminal through a MSG 3, or a terminal sends an SRS associated with a terminal identifier (a base station may determine position information of the terminal through the SRS), a network side device determines sending related information of sending a MSG 4 based on the position information of the terminal.

(1) The terminal determines a transmission parameter of a MSG 1 based on information about a plurality of detected reference signals or synchronization signals.

In an embodiment, the plurality of reference signals or synchronization signals are signals from a same cell or signals from different cells (for example, a serving cell and a neighboring cell). In an embodiment, in a cell free scenario, the plurality of reference signals or synchronization signals are sent through a same node or different nodes (for example, a plurality of SSBs are associated with different nodes).

In an embodiment, sync rasters of the plurality of reference signals or synchronization signals are different.

In an embodiment, frequency domain resources (for example, a carrier or a RB) and/or time domain resources of the plurality of reference signals or synchronization signals are different.

In an embodiment, sequence formats of the plurality of reference signals or synchronization signals are different.

In an embodiment, RSRP/SINR/RSRQ of the plurality of reference signals or synchronization signals is all greater than or equal to a third threshold, and/or a difference between the RSRP/SINR/RSRQ of the plurality of reference signals or synchronization signals is less than or equal to a fourth threshold. The third threshold and the fourth threshold are notified to the terminal by the network side device through a system message.

The transmission parameter of the MSG 1 is associated with information about the plurality of reference signals or synchronization signals (for example, an SSB). For details, refer to Table 8 below.

TABLE 8

| SSB information | Transmission parameter of MSG 1 |
|---|---|
| SSB 1, SSB 2 | {preamble index, preamble time domain resource, preamble frequency domain resource} combination 1 |
| SSB 2, SSB 3 | {preamble index, preamble time domain resource, preamble frequency domain resource} combination 2 |
| SSB 1, SSB 3 | {preamble index, preamble time domain resource, preamble frequency domain resource} combination 3 |
| SSB 2, SSB 3, SSB 1 | {preamble index, preamble time domain resource, preamble frequency domain resource} combination 4 |
| SSB 1 | {preamble index, preamble time domain resource, preamble frequency domain resource} combination 5 |
| SSB 2 | {preamble index, preamble time domain resource, preamble frequency domain resource} combination 6 |
| SSB 3 | {preamble index, preamble time domain resource, preamble frequency domain resource} combination 7 |

The preamble index is associated with a preamble sequence format (such as at least one of a sequence length, SCS, a root sequence, and the like).

Each combination of {preamble index, preamble time domain resource, preamble frequency domain resource} may include a plurality of value combinations of preamble indexes, preamble time domain resources, and preamble frequency domain resources, and the terminal may select a value combination of {preamble index, preamble time domain resource, preamble frequency domain resource} to send.

For example, there are two specific methods:

Method 1: The terminal determines, based on the plurality of reference signals or synchronization signals, an RO associated with the plurality of reference signals or synchronization signals, and then selects a preamble from all preambles of the RO, for example, randomly selects a preamble. The RO is defined as a time domain resource and a frequency domain resource of one MSG 1 transmission.

Method 2: The terminal determines, based on the plurality of reference signals or synchronization signals, an RO associated with the plurality of reference signals or synchronization signals and a preamble candidate set, and then selects a preamble from the preamble candidate set, for example, randomly selects a preamble.

(2) The terminal sends the MSG 1 based on the determined transmission parameter of the MSG 1.

(3) A base station receives the MSG 1 sent by the terminal.

(4) After receiving the MSG 1, the base station sends a MSG 2 to the terminal. A method for sending node information and/or beam related information of the MSG 2 by the base station includes at least one of the following:

The base station sends the MSG 2 to the terminal through N5 TCIs corresponding to N5 SSB indexes, and the N5 TCIs correspond to different transport blocks TB or a same TB. The N5 SSB indexes are determined by the base station through detected MSG 1 information and a preset mapping relationship.

The base station sends the MSG 2 to the terminal through X (N5>X>(1) TCIs of the N5 TCIs corresponding to the N5

SSB indexes. The N5 SSB indexes are determined by the base station through detected MSG 1 information and a preset mapping relationship.

The base station sends the MSG 2 to the terminal through a TCI corresponding to an SSB having an index different from the N5 SSB indexes, and in this case, the terminal needs to detect a new SSB and receive a corresponding MSG 2.

Different SSBs or TCIs may correspond to one or more APs.

(5) The terminal receives the MSG 2 sent by the base station. A receiving behavior of the terminal includes at least one of the following:

The terminal receives the MSG 2 sent by the N5 TCIs corresponding to the N5 SSB indexes (three possible results: receiving unsuccessfully; receiving the MSG 2 sent by X (N5>X>(1)TCIs; and receiving the MSG 2 sent, by the N5 TCIs).

The terminal receives a MSG 2 corresponding to one of the N5 TCIs corresponding to the N5 SSB indexes (two possible results: receiving unsuccessfully; and receiving successfully).

The terminal receives a MSG 2 sent by a TCI corresponding to an SSB having an index different from the N5 SSB indexes (two possible results: receiving unsuccessfully; and receiving successfully).

In an embodiment, the MSG 2 includes new QCL/TCI information. For example, the QCL/TCI is different from a QCL/TCI of a previous SSB. For example, the new QCL information is included in the MSG 2, and the terminal receives a MSG 4 by using the new QCL/TCI information. When the terminal receives the MSG 2, it is assumed that N5 pieces of TCI information corresponding to the N5 SSB indexes or one piece of TCI information corresponding to one SSB is used.

In an embodiment, a network may indicate a corresponding frequency domain position at which the terminal receives the MSG 4 in the MSG 2, to reduce interference.

(6) When the terminal successfully receives a MSG 2, and a preamble index in the MSG 2 is the same as a preamble index sent by the terminal, the terminal may stop listening to the MSG 2. If the terminal does not receive the MSG 2, or if the terminal receives the MSG 2 but the MSG 2 does not carry the preamble index of the terminal, the terminal retransmits the MSG 1.

(7) If the terminal successfully receives a MSG 2, and a preamble index carried in the MSG 2 is the same as the preamble index sent by the terminal, the terminal sends a MSG 3.

Solution 1: The MSG 3 implicitly or explicitly indicates the position related information of the terminal.

Solution 2: The terminal further sends an SRS before or after sending the MSG 3, or on at least one symbol of a slot in which the MSG 3 is located. The SRS is associated with a terminal ID and an association rule is predefined.

(8) If the base station successfully receives the MSG 3, the base station determines sending related information of the MSG 4 based on a transmission parameter of the MSG 3 or position related information carried by the MSG 3.

(9) If the base station receives the SRS associated with the terminal ID, the base station determines a terminal position based on the SRS, and determines sending related information of a MSG 4 corresponding to the terminal position.

(10) The base station sends the MSG 4 based on the sending related information determined in (8) or (9).

In an embodiment, before sending the MSG 4, the base station sends an SSB or a TRS (for assisting the terminal to receive the MSG (4) to the terminal based on sending related information associated with the terminal position.

(11) The terminal receives the MSG 4 sent by the base station. If the terminal detects the SSB or the TRS sent by the base station before the terminal receives the MSG 4. the terminal assumes that the MARS of the MSG 4 is quasi co-located with the detected SSB or TRS. In an embodiment, the terminal assumes that the DMRS of the MSG 4 is quasi co-located with the DMRS of the MSG 2.

It needs to be noted that, the random access method provided in embodiments of this application may be performed by a random access apparatus or a control module included in the random access apparatus and configured to perform and load the random access method. In embodiments of this application, the random access apparatus provided in embodiments of this application is described by using an example in which the random access method is performed by the random access apparatus.

Figure 4:
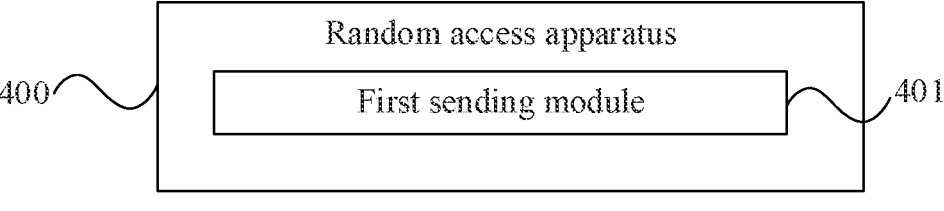
FIG. 4 is a first schematic structural diagram of a random access apparatus according to an embodiment of this application.

As shown in FIG. 4, according to an embodiment of this application, a random access apparatus 400 is further provided, and applied to a terminal. The apparatus includes:

a first sending module 401, configured to send a random access first target message, where a transmission parameter of the first target message is associated with position related information of the terminal, or the first target message carries position related information of the terminal, where the transmission parameter of the first target message includes at least one of:

sequence information of the first target message;

time domain resource information of the first target message;

frequency domain resource information of the first target message; and sequence information of a demodulation reference signal included in the first target message.

In an embodiment, the apparatus further includes:

a second receiving module, configured to receive a random access second target message sent by at least one first node, where sending related information of the second target message is associated with the transmission parameter of the first target message, or sending related information of the second target message is associated with the position related information of the terminal, where the sending related information of the second target message includes at least one of: identification information of the at least one first node; and beam related information of the second target message.

In an embodiment, the first target message includes: a message 1 in a four-step random access, and the second target message includes: at least one of a message 2 and a message 4 in the four-step random access;

or, the first target message includes: a message 3 in a four-step random access; and the second target message includes: a message 4 in the four-step random access.

In an embodiment, the apparatus includes:

a position determining module, configured to measure N1 first signals, and determine the position related information of the terminal; where N1 is an integer greater than or equal to 1.

In an embodiment, the position related information of the terminal includes:

position information of the terminal; and a measurement item related to a terminal position and measured by the terminal.

an embodiment, the apparatus further includes:

a parameter determining module, configured to determine, based on the position related information of the terminal, the transmission parameter of the first target message associated with the position related information; and the first sending module includes:

a first sending submodule, configured to send the first target message based on the determined transmission parameter.

In an embodiment, the apparatus further includes:

a first determining module, configured to determine, based on at least one of measured reference signal received power RSRP of N2 first signals and N2 path losses, at least one of transmit power and a sending carrier of the first target message, where N2 is an integer greater than or equal to 1, and the N2 path losses are associated with the RSRP of the N2 first signals; and the first sending module includes:

a second sending submodule, configured to send the first target message based on at least one of the determined transmit power and the determined sending carrier of the first target message.

In an embodiment, in a case that the first target message is the message 1 and the second target message is the message 2, the message 2 includes at least one of:

identification information of a sending node of the message 4;

sending beam related information of the message 4;

time domain resource information of the message 4; and frequency domain resource information of the message 4.

In an embodiment, the second receiving module includes:

a second receiving submodule, configured to receive, based on target beam related information, the random access second target message sent by the at least one first node, where when the second target message is the message 2, the target beam related information is beam related information of at least one first signal with greatest signal strength in N3 first signals measured by the terminal, and N3 is an integer greater than or equal to 1; or when the second target message is the message 4, the target beam related information is beam related information of the message 2.

In an embodiment, the apparatus further includes:

a third receiving module, configured to receive a first signal sent by the at least one first node.

The second receiving module includes:

a third receiving submodule, configured to receive, based on beam related information of the first signal sent by the at least one first node, the random access second target message sent by the at least one first node.

In an embodiment, the second target message further includes: the position related. information of the terminal.

In an embodiment, the apparatus further includes:

a third determining module, configured to determine, if the position related information of the terminal carried in the second target message is the same as the position related information of the terminal carried in the first target message, that the terminal successfully receives the second target message; or a resending module, configured to resend the first target message if the position related information of the terminal is not carried in the second target message, or the position related information of the terminal carried in the second target message is different from the position related information of the terminal carried in the first target message.

In an embodiment, in a case that the first target message is the message 1 and the second target message is the message 2, the apparatus further includes:

a second sending module, configured to send the message 3 to a target node in the at least one first node, where the message 3 implicitly or explicitly indicates that the terminal successfully receives sending related information corresponding to the message 2; and a third receiving module, configured to receive the message 4 sent by the target node, where beam related information of the message 4 is the same as beam related information of the message 2; or beam related information of the message 4 is the same as beam related information carried in the message 3.

In an embodiment, in a case that the first target message is the message 3 and the second target message is the message 4. the apparatus further includes:

a third sending module, configured to send, before the message 3 is sent, a reference signal associated with a terminal identifier;

send, after the message 3 is sent, a reference signal associated with a terminal identifier; or send a reference signal associated a terminal identifier on at least one symbol of a slot in which the message 3 is located.

In an embodiment, the apparatus further includes:

a fourth receiving module, configured to receive first signaling, where the first signaling includes at least one of the following information:

identification information of at least two cells;

identification information of at least two nodes;

position information of the at least two cells;

position information of the at least two nodes;

information about a first signal associated with each cell; and information about a first signal associated with each node.

an embodiment, the apparatus further includes:

a fifth receiving module; configured to receive second signaling, where the second signaling is used for indicating resource information of a shared random access channel corresponding to at least two cells or at least two nodes.

In embodiments of this application, the terminal explicitly or implicitly indicates the position related information of the terminal through the random access first target message, so that the network side may adjust, based on the position related information of the terminal, related information of a node and/or a beam for sending the second target message, to reduce potential inter-node interference and improve received signal quality of the second target message.

It needs to be noted that, if the random access apparatus provided in embodiments of this application is an apparatus capable of performing the random access method, all embodiments of the random access method are applicable to the apparatus and can achieve the same or similar beneficial effects.

Figure 5:
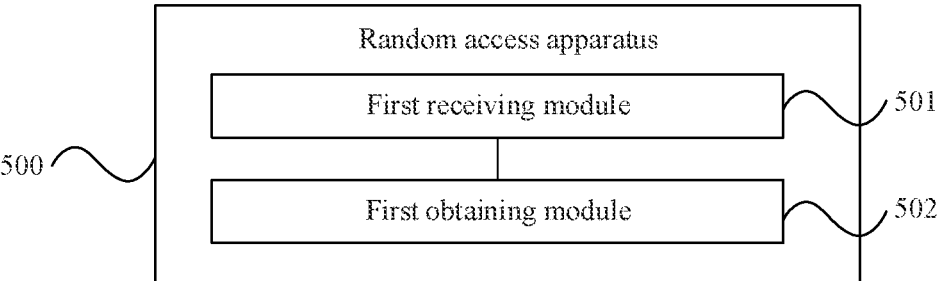
FIG. 5 is a second schematic structural diagram of a random access apparatus according to an embodiment of this application.

As shown in FIG. 5, according to an embodiment of this application, a random access apparatus 500 is further provided, and applied to a network side device. The apparatus includes:

a first receiving module 501, configured to receive a random access first target message; and a first obtaining module 502, configured to obtain a transmission parameter of the random access first target message or position related information of a terminal carried in the random access first target message, where the transmission parameter of the first target message is associated with the position related information of the terminal, where the transmission parameter of the first target message includes at least one of:

sequence information of the first target message;

time domain resource information of the first target message;

frequency domain resource information of the first target message; and sequence information of a demodulation reference signal included in the first target message.

In an embodiment, the apparatus further includes:

an information determining module, configured to determine, based on the transmission parameter of the first target message or the position related information of the terminal, sending related information of a random access second target message, where the sending related information of the second target message includes at least one of: identification information of at least one first node for sending the second target message, and beam related information of the second target message; and a fourth sending module, configured to send, based on the sending related information of the second target message, the second target message through at least one first node.

In an embodiment, the first target message includes: a message 1 in a four-step random access, and the second target message includes: at least one of a message 2 and a message 4 in the four-step random access;

or, the first target message includes: a message 3 in a four-step random access; and the second target message includes: a message 4 in the four-step random access.

In an embodiment, the information determining module includes:

a first determining submodule, configured to determine, based on the transmission parameter of the first target message, sending related information associated with the transmission parameter of the first target message; and a second determining submodule, configured to determine the sending related information associated with the transmission parameter of the first target message as the sending related information of the second target message.

In an embodiment, the position related information of the terminal includes:

position information of the terminal; and a measurement item related to a terminal position and measured by the terminal.

In an embodiment, the information determining module includes:

a third determining submodule, configured to determine, based on the position related information of the terminal, sending related information associated with the terminal position; and a fourth determining submodule, configured to determine the sending related information associated with the terminal position as the sending related information of the second target message.

In an embodiment, in a case that the first target message is the message 1 and the second target message is the message 2, the message 2 includes at least one of:

identification information of a sending node of the message 4;

sending beam related information of the message 4;

time domain resource information of the message 4; and frequency domain resource information of the message 4.

In an embodiment, the apparatus further includes:

a fifth sending module, configured to send a first signal through at least one first node, where beam related information of the first signal is -the same as the beam related information of the second target message.

In an embodiment, the second target message further includes: the position related. information of the terminal .

In an embodiment, in a case that the first target message is the message 3 and the second target message is the message 4, the apparatus further includes:

a position determining module, configured to receive, through at least two nodes, a reference signal sent by the terminal and associated with a terminal identifier, and determine a terminal position; and a sixth sending module, configured to send the second target message based on sending related information associated with the terminal position.

In an embodiment, the apparatus further includes:

a seventh sending module, configured to send first signaling to the terminal, where the first signaling includes at least one of the following information:

identification information of at least two cells;

identification information of at least two nodes;

position information of the at least two cells;

position information of the at least two nodes;

information about a first signal associated with each cell; and information about a first signal associated with each node.

In an embodiment, the apparatus further includes:

an eighth sending module, configured to send second signaling to the terminal, where the second signaling is used for indicating resource information of a shared random access channel corresponding to at least two cells or at least two nodes.

In embodiments of this application, the terminal explicitly or implicitly indicates the position related information of the terminal through the random access first target message, so that the network side may adjust, based on the position related information of the terminal, related information of a node and/or a beam for sending the second target message, to reduce potential inter-node interference and improve received signal quality of the second target message.

It needs to be noted that; if the random access apparatus provided in embodiments of this application is an apparatus capable of performing the random access method, all embodiments of the random access method are applicable to the apparatus and can achieve the same or similar beneficial effects.

The random access apparatus in embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine, or a self-service machine. This is not specifically limited in embodiments of this application.

The random access apparatus in embodiments of this application may be an apparatus with an operating system. The operating system may be an Android operating system, or may be an iOS operating system or other possible operating systems, which is not specifically limited in embodiments of this application.

The random access apparatus provided in embodiments of this application may implement the processes implemented in the method embodiments of FIG. 1 to FIG. 3. To avoid repetition, details are not described herein again.

Figure 6:
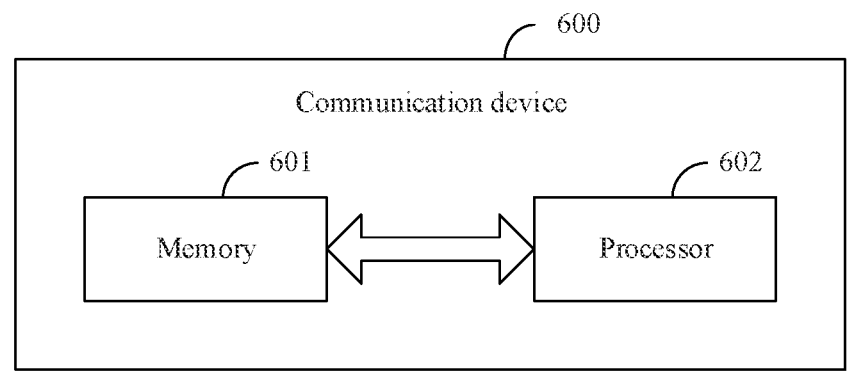
FIG. 6 is a schematic structural diagram of a communication device according to an embodiment of this application.

In an embodiment, as shown in FIG. 6, embodiments of this application further provide a communication device 600, including a processor 601, a memory 602, and a program or an instruction stored in the memory 602 and executable on the processor 601. For example, when the communication device 600 is a terminal, the program or instruction is executed by the processor 601 to implement processes of the foregoing embodiments of the random access method, and the same technical effects can be achieved. When the communication device 600 is a network side device, the program or instruction is executed by the processor 601 to implement processes of the foregoing embodiments of the random access method, and the same technical effect can be achieved. To avoid repetition, details are not described herein again.

Figure 7:
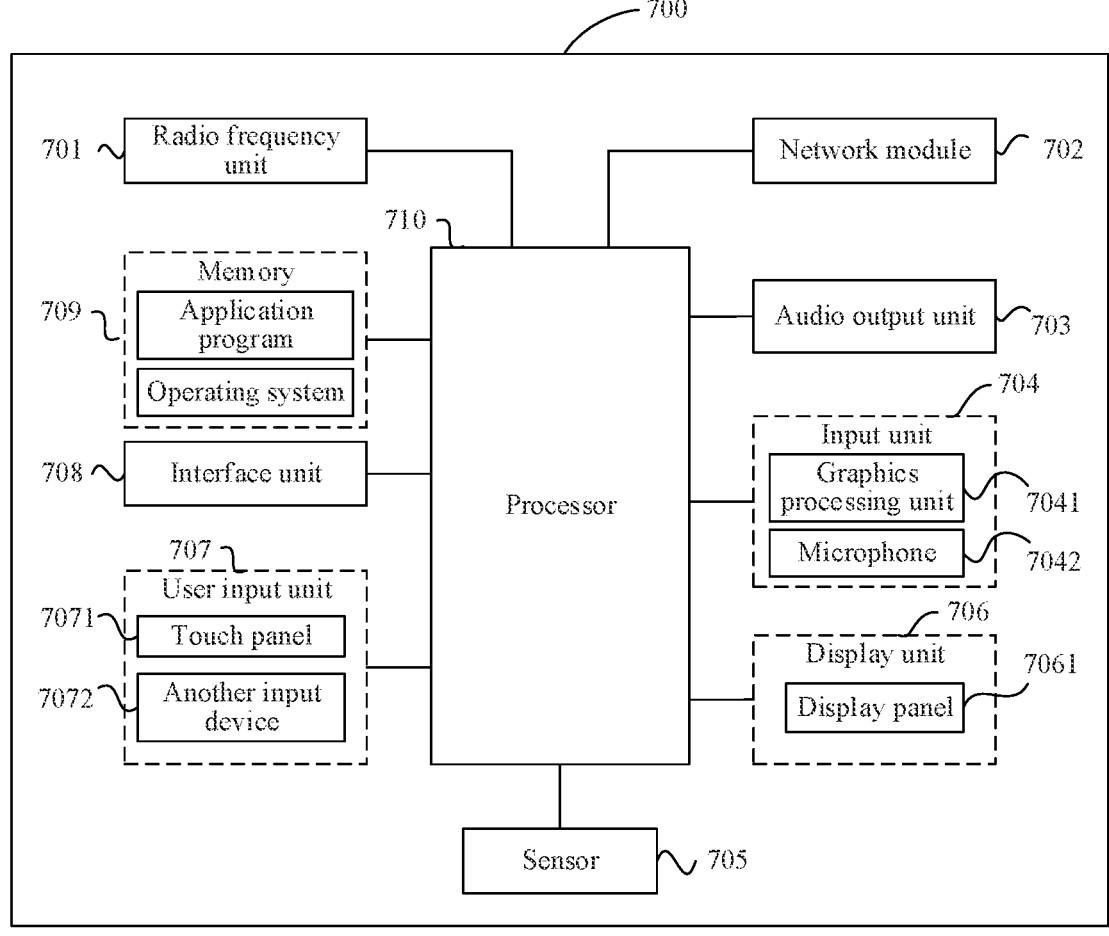
FIG. 7 is a schematic structural diagram of a terminal according to an embodiment of this application.

FIG. 7 is a schematic structural diagram of hardware of a terminal implementing an embodiment of this application.

The terminal 700 includes, but is not limited to: components such as a radio frequency unit 701, a network module 702, an audio output unit 703, an input unit 704, a sensor 705, a display unit 706, a user input unit 707, an interface unit 708, a memory 709, and a processor 710.

Those skilled in the art may understand that the terminal 700 may further include a power supply (such as a battery) for supplying power to the components. The power supply may be logically connected to the processor 710 by using a power supply management system, thereby implementing functions such as charging, discharging, and power consumption management, by using the power supply management system. A terminal structure shown in FIG. X does not constitute a limitation to the terminal, and the terminal may include more or fewer components than those shown in the figure, or some components may be combined, or a different component deployment may be used. Details are not described herein again.

It should be understood that in the embodiment of this application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. The display panel 7061 may be configured by using a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (for example, a volume control key or a switch key), a track ball, a mouse, and a joystick, and the details are not described herein again.

In the embodiment of this application, the radio frequency unit 701 is configured to receive downlink data from a network side device and transmit the downlink data to the processor 710 for processing; and send uplink data to the network side device. Generally, the radio frequency unit 701 includes, but is not limited to, an antenna, at least one amplifier, a. transceiver, a coupler, a low noise amplifier, a duplexer, and the like.

The memory 709 may be configured to store a software program or instruction and various data. The memory 709 may mainly include a program or instruction storage area and a data storage area. The program or instruction storage area may store an operating system, an application program or instruction required by at least one function (for example, a sound playback function and an image display function), and the like. In addition, the memory 709 may include a high-speed random access memory and may also include a non-volatile memory. The non-volatile memory may be a Read-Only Memory (ROM), a Programmable ROM (PROM), an Erasable PROM (EPROM), an Electrically EPROM (EEPROM), or a flash memory. The memory 709 may include, for example, at least one magnetic disk memory device, a flash memory device, or other non-volatile solid-state memory devices.

The processor 710 may include one or more processing units. In an embodiment, the processor 710 may integrate an application processor and a modem processor, where the application processor mainly processes an operating system, a user interface, an application program or instruction, and the like, and the modem processor mainly processes wireless communication, such as a baseband processor. It may be understood that the modem processor may alternatively not be integrated into the processor 710.

The radio frequency unit 701 is configured to send a random access first target message, where a transmission parameter of the first target message is associated with position related information of the terminal, or the first target message carries position related information of the terminal, where the transmission parameter of the first target message includes at least one of:

sequence information of the first target message;

time domain resource information of the first target message;

frequency domain resource information of the first target message; and sequence information of a demodulation reference signal included in the first target message.

In an embodiment, the radio frequency unit 701 is further configured to receive a random access second target message sent by at least one first node, where sending related information of the second target message is associated with the transmission parameter of the first target message, or sending related information of the second target message is associated with the position related information of the terminal, where the sending related information of the second target message includes at least one of: identification information of the at least one first node; and beam related information of the second target message.

In embodiments of this application, the terminal explicitly or implicitly indicates the position related information of the terminal through the random access first target message, so that the network side may adjust, based on the position related information of the terminal, related information of a node and/or a beam for sending the second target message, to reduce potential inter-node interference and improve received signal quality of the second target message.

It needs to be noted that, if the terminal provided in embodiments of this application is a terminal capable of performing the random access method, all embodiments of the random access method are applicable to the terminal and can achieve the same or similar beneficial effects.

Figure 8:
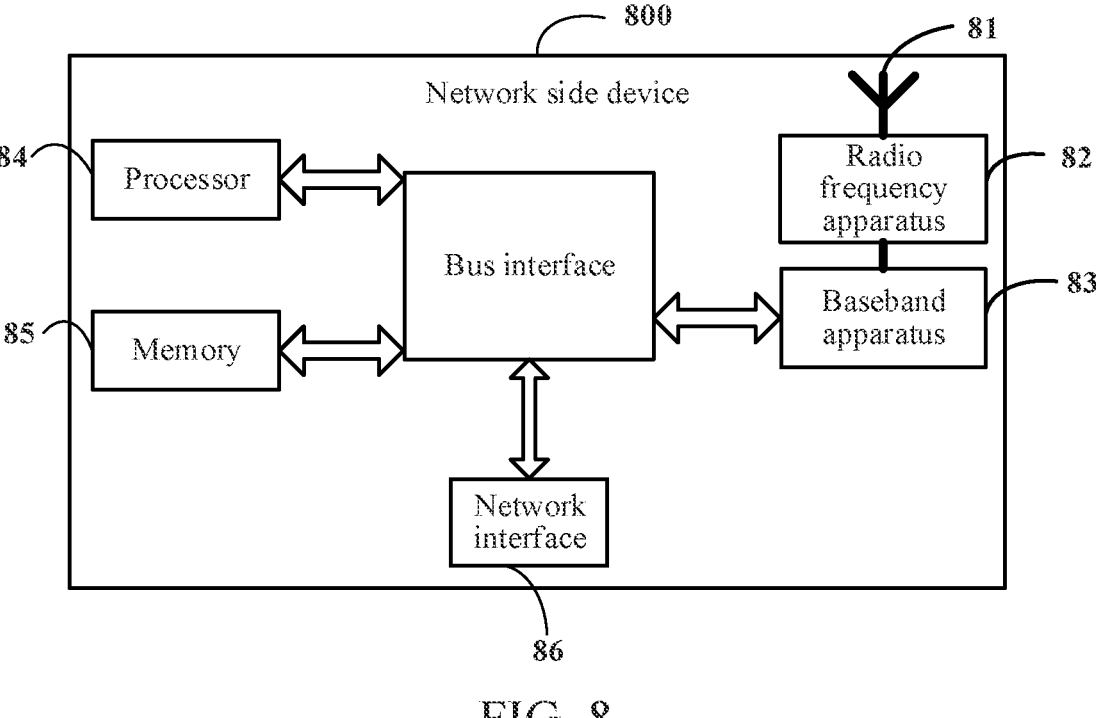
FIG. 8 is a schematic structural diagram of a network side device according to an embodiment of this application.

An embodiment of this application further provides a network side device. As shown in FIG. 8, the network device 800 includes: an antenna 81, a radio frequency apparatus 82, and a baseband apparatus 83. The antenna 81 is connected to the radio frequency apparatus 82. In an uplink direction, the radio frequency apparatus 82 receives information through the antenna 81, and sends the received information to the baseband apparatus 83 for processing. In a downlink direction, the baseband apparatus 83 processes to-be-sent information, and sends the information to the radio frequency apparatus 82. The radio frequency apparatus 82 processes the received information and sends the information through the antenna 81.

The frequency band processing apparatus may be located in the baseband apparatus 83. The method performed by the network side device in the foregoing embodiments may be implemented in the baseband apparatus 83, and the baseband apparatus 83 includes a processor 84 and a memory 85.

The baseband apparatus 83 may include, for example, at least one baseband plate. A plurality of chips are disposed on the baseband plate. As shown in FIG. 8, one of the plurality of chips is, for example, the processor 84, and is connected to the memory 85, to invoke a program in the memory 85 to perform operations of the network device in the foregoing method embodiments.

The baseband apparatus 83 may further include a network interface 86, configured to exchange information with the radio frequency apparatus 82. The interface is, for example, a Common Public Radio Interface (CPRI).

The network side device provided in the embodiments of the present disclosure further includes: an instruction or program stored in the memory 85 and executable in the processor 84. The processor 84 invokes the instruction or program in the memory 85 to perform the method performed by each module shown in FIG. 3 and achieve the same technical effect. To avoid repetition, details are not described herein again.

An embodiment of this application further provides a readable storage medium, and the readable storage medium stores a program or an instruction. The program or instruction is executed by a processor to implement the processes of the embodiments of the random access method, and the same technical effects can be achieved. To avoid repetition, details are not described herein again.

The processor is a processor in the electronic device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip. The chip includes a processor and a communication interface. The communication interface is coupled to the processor, and the processor is configured to run a program or an instruction to implement processes of the embodiments of the random access method, and the same technical effect can be achieved. To avoid repetition, details are not described herein again.

An embodiment of this application provides a computer program product. The program product is stored in a non-volatile storage medium. The program product is executed by at least one processor to implement processes of the foregoing embodiments of the random access method, and the same technical effect can be achieved. To avoid repetition, details are not described herein again.

An embodiment of this application provides a communication device. The communication device is configured to perform processes of the embodiments of the random access method, and the same technical effect can be achieved. To avoid repetition, details are not described herein again.

It should be noted that, the chip mentioned in embodiments of this application may also be referred to as a system-level chip, a system chip, a chip system, a system on chip, or the like.

It needs to be noted that, terms "include," "comprise," and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the implementations of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may understand that the method according to the foregoing embodiments may be implemented through software and a necessary general hardware platform, and certainly, may also be implemented through hardware. Based on such an understanding, the technical solutions of this application essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to embodiments of this application.

Although embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A random access method, comprising:

sending, by a terminal, a random access first target message, wherein a transmission parameter of the first target message is associated with position related information of the terminal, wherein the transmission parameter of the first target message comprises at least one of:

sequence information of the first target message;

time domain resource information of the first target message;

frequency domain resource information of the first target message; or sequence information of a demodulation reference signal comprised in the first target message.

2. The method according to claim 1, wherein after the sending, by a terminal, a random access first target message, the method further comprises:

receiving, by the terminal, a random access second target message sent by at least one first node, wherein sending related information of the second target message is associated with the transmission parameter of the first target message, or sending related information of the second target message is associated with the position related information of the terminal, wherein the sending related information of the second target message comprises at least one of:

identification information of the at least one first node; or beam related information of the second target message, and wherein the first target message comprises: a message 1 in a four-step random access; and the second target message comprises: at least one of a message 2 or a message 4 in the four-step random access; or the first target message comprises: a message 3 in a four-step random access; and the second target message comprises: a message 4 in the four-step random access.

3. The method according to claim 1, wherein the position related information of the terminal comprises:

position information of the terminal; and a measurement item related to a terminal position and measured by the terminal.

4. The method according to claim 1, further comprising:

determining, based on the position related information of the terminal, the transmission parameter of the first target message associated with the position related information, wherein the sending a random access first target message comprises:

sending the first target message based on the determined transmission parameter.

5. The method according to claim 1, wherein before the sending a random access first target message, the method further comprises:

determining, based on at least one of measured Reference Signal Received Power (RSRP) of N2 first signals and N2 path losses, at least one of transmit power and a sending carrier of the first target message, wherein N2 is an integer greater than or equal to 1, and the N2 path losses are associated with the RSRP of the N2 first signals; and the sending a random access first target message comprises:

sending the first target message based on at least one of the determined transmit power and the determined sending carrier of the first target message.

6. The method according to claim 2, wherein when the first target message is the message 1 and the second target message is the message 2, the message 2 comprises at least one of:

identification information of a sending node of the message 4;

sending beam related information of the message 4;

time domain resource information of the message 4; or frequency domain resource information of the message 4.

7. The method according to claim 2, wherein the receiving a random access second target message sent by at least one first node comprises:

receiving, based on target beam related information, the random access second target message sent by the at least one first node, wherein when the second target message is the message 2, the target beam related information is beam related information of at least one first signal with greatest signal strength in N3 first signals measured by the terminal, and N3 is an integer greater than or equal to 1; or when the second target message is the message 4, the target beam related information is beam related information of the message 2.

8. The method according to claim 2, wherein the first target message carries position related information of the terminal, wherein before the receiving a random access second target message sent by at least one first node, the method further comprises:

receiving a first signal sent by the at least one first node, wherein the receiving a random access second target message sent by at least one first node comprises:

receiving, based on beam related information of the first signal sent by the at least one first node, the random access second target message sent by the at least one first node, and wherein after the receiving a random access second target message sent by at least one first node, the method further comprises:

determining, when the position related information of the terminal carried in the second target message is the same as the position related information of the terminal carried in the first target message, that the terminal successfully receives the second target message; or resending the first target message when the position related information of the terminal is not carried in the second target message, or that the position related information of the terminal carried in the second target message is different from the position related information of the terminal carried in the first target message.

9. The method according to claim 2, wherein when the first target message is the message 1 and the second target message is the message 2, the method further comprises:

sending the message 3 to a target node in the at least one first node, wherein the message 3 implicitly or explicitly indicates that the terminal successfully receives sending related information corresponding to the message 2; and receiving the message 4 sent by the target node, wherein beam related information of the message 4 is the same as beam related information of the message 2, or wherein the beam related information of the message 4 is the same as beam related information carried in the message 3, wherein when the first target message is the message 3 and the second target message is the message 4, the method further comprises:

sending, before the message 3 is sent, a reference signal associated with a terminal identifier;

sending, after the message 3 is sent, a reference signal associated with a terminal identifier; or sending a reference signal associated with a terminal identifier on at least one symbol of a slot in which the message 3 is located.

10. The method according to claim 1, wherein before the sending a random access first target message, the method further comprises:

receiving first signaling, wherein the first signaling comprises at least one of the following information:

identification information of at least two cells;

identification information of at least two nodes;

position information of the at least two cells;

position information of the at least two nodes;

information about a first signal associated with each cell; or information about a first signal associated with each node.

11. The method according to claim 1, wherein before the sending a random access first target message, the method further comprises:

receiving second signaling, wherein the second signaling is used for indicating resource information of a shared random access channel corresponding to at least two cells or at least two nodes.

12. A random access method, comprising:

receiving, by a network side device, a random access first target message; and obtaining, by the network side device, a transmission parameter of the random access first target message, wherein the transmission parameter of the first target message is associated with position related information of the terminal, wherein the transmission parameter of the first target message comprises at least one of:

sequence information of the first target message;

time domain resource information of the first target message;

frequency domain resource information of the first target message; or sequence information of a demodulation reference signal comprised in the first target message.

13. The method according to claim 12, further comprising:

determining, by the network side device based on the transmission parameter of the first target message or the position related information of the terminal, sending related information of a random access second target message, wherein the sending related information of the second target message comprises at least one of: identification information of at least one first node for sending the second target message, or beam related information of the second target message; and sending, by the network side device based on the sending related information of the second target message, the second target message through at least one first node.

14. The method according to claim 13, wherein the first target message comprises: a message 1 in a four-step random access, and the second target message comprises: at least one of a message 2 or a message 4 in the four-step random access; or the first target message comprises: a message 3 in a four-step random access, and the second target message comprises: a message 4 in the four-step random access.

15. The method according to claim 13, wherein the determining, based on the transmission parameter of the first target message, sending related information of a random access second target message comprises:

determining, based on the transmission parameter of the first target message, sending related information associated with the transmission parameter of the first target message; and determining the sending related information associated with the transmission parameter of the first target message as the sending related information of the second target message.

16. The method according to claim 12, wherein the position related information of the terminal comprises:

position information of the terminal; and a measurement item related to a terminal position and measured by the terminal, and wherein the determining, based on the position related information of the terminal, sending related information of a random access second target message comprises:

determining, based on the position related information of the terminal, sending related information associated with the terminal position; and determining the sending related information associated with the terminal position as the sending related information of the second target message.

17. The method according to claim 14, wherein when the first target message is the message 1 and the second target message is the message 2, the message 2 comprises at least one of:

identification information of a sending node of the message 4;

sending beam related information of the message 4;

time domain resource information of the message 4; or frequency domain resource information of the message 4.

18. The method according to claim 13, wherein before the sending, based on the sending related information of the second target message, the second target message through at least one first node, the method further comprises:

sending a first signal through at least one first node, wherein beam related information of the first signal is the same as the beam related information of the second target message.

19. The method according to claim 14, wherein when the first target message is the message 3 and the second target message is the message 4, and wherein before the sending, based on the sending related information of the second target message, the second target message through at least one first node, the method further comprises:

receiving, by the network side device through at least two nodes, a reference signal sent by the terminal and associated with a terminal identifier, and determining a terminal position; and sending the second target message based on sending related information associated with the terminal position.

20. The method according to claim 12, wherein before the receiving, by a network side device, a random access first target message, the method further comprises:

sending first signaling to the terminal, wherein the first signaling comprises at least one of the following information:

identification information of at least two cells;

identification information of at least two nodes;

position information of the at least two cells;

position information of the at least two nodes;

information about a first signal associated with each cell; or information about a first signal associated with each node, and wherein before the receiving, by a network side device, a random access first target message, the method further comprises:

sending second signaling to the terminal, wherein the second signaling is used for indicating resource information of a shared random access channel corresponding to at least two cells or at least two nodes.

\* \* \* \* \*